(12) United States Patent
Pan (10) Patent No.: US 8,531,854 B2
(45) Date of Patent: Sep. 10, 2013

(54) POWER FACTOR CORRECTION CONVERTER AND POWER FACTOR CORRECTION CONVERSION DEVICE

(75) Inventor: Denghai Pan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/590,938

(22) Filed: Aug. 21, 2012

(65) Prior Publication Data

US 2013/0003427 A1    Jan. 3, 2013

Related U.S. Application Data

(63) Continuation of application No. PCT/CN2011/076781, filed on Jul. 1, 2011.

(51) Int. Cl.
    *H02M 7/217*      (2006.01)

(52) U.S. Cl.
    USPC ............................................................ 363/89

(58) Field of Classification Search
    USPC ........................................... 363/89, 126, 127
    See application file for complete search history.

(56) References Cited

U.S. PATENT DOCUMENTS

| | | | | |
|---|---|---|---|---|
| 4,924,372 A * | 5/1990 | Fox et al. | ......................... | 363/89 |
| 8,325,501 B2 * | 12/2012 | Torrico-Bascope | ............ | 363/47 |
| 8,395,913 B2 * | 3/2013 | Torrico-Bascope | ............ | 363/47 |
| 2004/0047167 A1 | 3/2004 | Prasad et al. | | |
| 2006/0208711 A1 | 9/2006 | Soldano et al. | | |
| 2007/0279955 A1 | 12/2007 | Liu et al. | | |
| 2008/0278985 A1 * | 11/2008 | Ribarich | ........................ | 363/127 |
| 2009/0040800 A1 | 2/2009 | Sonnaillon et al. | | |
| 2012/0026768 A1 * | 2/2012 | Lopez-Santillana | .......... | 363/126 |
| 2013/0003427 A1 * | 1/2013 | Pan | ................. | 363/44 |

FOREIGN PATENT DOCUMENTS

| | | |
|---|---|---|
| CN | 2670984 Y | 1/2005 |
| CN | 1797912 A | 7/2006 |
| CN | 101083398 A | 12/2007 |
| CN | 101621247 A | 1/2010 |
| CN | 101645649 A | 2/2010 |

OTHER PUBLICATIONS

International search report for International application No. PCT/CN2011/076781, dated Apr. 12, 2012, total 12 pages.

(Continued)

*Primary Examiner* — Jeffrey Sterrett
(74) *Attorney, Agent, or Firm* — Conley Rose, P.C.; Grant Rodolph; Nicholas K. Beaulieu (57) ABSTRACT

A power factor correction converter and a power factor correction conversion device, includes two groups of bidirectional switches, an autotransformer, a boost inductor, a bus filter capacitor, two front bridge arms; and a rear bridge arm; the front end of each group of bidirectional switches are connected to a coil of the autotransformer in one-to-one correspondence, and a rear end of each group of bidirectional switches is connected to one end of an AC input power grid; a central tap of the autotransformer is connected to an output end of the boost inductor, and an input end of the boost inductor is connected to the other end of the AC input power grid; a front end of each group of bidirectional switches is connected to a front bridge arm, and a rear end is connected to the rear bridge arm.

7 Claims, 8 Drawing Sheets

Front bridge arm      Rear bridge arm

(56) References Cited

OTHER PUBLICATIONS

Grover Victor Torrico-Bascope et al., "A single phase PFC 3kW converter using a three-state switching Cell," 2004 35th Annual IEEE Power Electronics Specialists Conference, Aachen, Germany, 2004, total 6 pages.

Daniel Tollik et al., "Comparative Analysis of 1-Phase Active Power Factor Correction Topologies," 0-7803-0779-8/92, IEEE, 1992, total 7 pages.

First office action issued in corresponding Chinese patent application 201180001243.1, dated Dec. 11, 2012, and English translation thereof, total 9 pages.

* cited by examiner

Front bridge arm   Rear bridge arm

FIG. 11

POWER FACTOR CORRECTION CONVERTER AND POWER FACTOR CORRECTION CONVERSION DEVICE

CROSS-REFERENCE TO RELATED APPLICATIONS

This application is a continuation of International Application No. PCT/CN2011/076781, filed on Jul. 1, 2011, which is hereby incorporated by reference in its entirety.

FIELD OF THE INVENTION

The present invention relates to the field of power rectification technologies, and in particular, to a power factor correction converter and a power factor correction conversion device.

BACKGROUND OF THE INVENTION

A rectifier module of the communications power supply usually consists of a two-stage circuit topology, where the main function of a pre-stage power factor correction (Power Factor Correction, PFC) circuit is to implement the power factor correction, and at the same time provide a post-stage direct current-direct current (DC-DC) conversion circuit with a stable high-voltage DC input (usually 400 V) which is not isolated from the power grid. The post-stage DC-DC conversion circuit then converts the non-isolated DC high voltage into a 43 V to 58 V DC voltage required by a communications device.

At present, a rectifier module of the communications power supply combining the interleaving technology and bidirectional switch bridgeless PFC is used. However, in the interleaving technology, the peak voltages at two ends of a boost inductor are 400 V, the inductance ripple current is high, the effective value of the current passing through a switching transistor is great, and the size is large. Therefore, the conversion efficiency and the power density are low.

SUMMARY OF THE INVENTION

The embodiments of the present invention provide a power factor correction converter and a power factor correction conversion device, which can solve the technical problems of the low conversion efficiency and power density in the prior art.

To achieve the foregoing purpose, the embodiments of the present invention use the following technical solutions.

The power factor correction converter includes at least two groups of bidirectional switches, an autotransformer, a boost inductor, a bus filter capacitor, at least two front bridge arms, and a rear bridge arm. A front end of each group of bidirectional switches is correspondingly connected to a coil of the autotransformer, and a rear end of each group of bidirectional switches is connected to one end of an AC input power grid. A central tap of the autotransformer is connected to an output end of the boost inductor, and an input end of the boost inductor is connected to the other end of the AC input power grid; or, a central tap of the autotransformer is connected to the other end of the AC input power grid, and the boost inductor is integrated in the autotransformer. The front end of each of the at least two groups of bidirectional switches is connected to an intermediate connection point of one of the front bridge arms, and the rear end of each of the at least two groups of bidirectional switches is connected to an intermediate connection point of the rear bridge arm. Each of the front bridge arms includes two diodes unidirectionally connected in series, the intermediate connection point is located between the two diodes, and two ends of each of the front bridge arms are connected to two ends of the bus filter capacitor, respectively. The rear bridge arm includes two diodes unidirectionally connected in series, the intermediate connection points are located between the two diodes, and two ends of the rear bridge arm are connected to two ends of the bus filter capacitor, respectively.

The power factor correction conversion device includes the foregoing power factor correction converter, an AC input power grid, and a load. One end of the AC input power grid is connected to rear ends of each group of bidirectional switches, and the other end of the AC input power grid is connected to an input end of the boost inductor. Two ends of the load are connected to two ends of the bus filter capacitor, respectively.

By taking two groups of bidirectional switches as an example, in the power factor correction converter provided in an embodiment of the present invention, a boost inductor, an autotransformer, and two groups of bidirectional switches form a tristate switch unit circuit, which includes three working states: two groups of bidirectional switches being turned on simultaneously, two groups of bidirectional switches being turned off simultaneously, and one group of bidirectional switches being turned on and the other group of bidirectional switches being turned off. To achieve better technical effect, an autotransformer in which two coils have the same number of turns can be selected.

Compared with the prior art, the foregoing technical solutions provided in the present invention have the following advantages. When a tristate switch unit circuit is used, the boost inductor is charged twice and discharged twice in one switching period, ripples on the boost inductor and the bus filter capacitor are reduced and the effective value of the current passing through a transistor of a bidirectional switch becomes smaller, thereby improving the conversion efficiency. In addition, the frequency of the ripple on the boost inductor is twice as much as that of a switch, so that the inductance of the boost inductor is decreased by 50%, which makes the size of the circuit smaller and the power density higher, thereby solving the technical problems of the low conversion efficiency and power density in the prior art.

When three or more groups of bidirectional switches are used, a multistate switch unit circuit formed by a boost inductor, an autotransformer, and multiple groups of bidirectional switches has four or more working states. Each case includes two states, that is, each group of bidirectional switches being turned on simultaneously and each group of bidirectional switches being turned off simultaneously, and more working states that occur when some bidirectional switches are turned on and some bidirectional switches are turned off. In one switching period, the number of times that a boost inductor is charged and discharged is equal to the number of groups of bidirectional switches. Therefore, when more groups of bidirectional switches are used, the ripple on the boost inductor becomes smaller, so that the inductance of the boost inductor is further decreased, thereby improving the conversion efficiency and power density.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

FIG. 1 is a schematic connection diagram of a power factor correction converter according to Embodiment 1 of the present invention.

DETAILED DESCRIPTION OF THE EMBODIMENTS

The technical solutions according to embodiments of the present invention are clearly and completely described in the following with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

An embodiment of the present invention provides a power factor correction converter, which includes at least two groups of bidirectional switches, an autotransformer, a boost inductor, a bus filter capacitor, at least two front bridge arms, and a rear bridge arm. A front end of each group of the at least two groups of bidirectional switches is connected to a coil of the autotransformer in one-to-one correspondence, and a rear end of each group of bidirectional switches is connected to one end of an AC input power grid. A central tap of the autotransformer is connected to an output end of the boost inductor, and an input end of the boost inductor is connected to the other end of the AC input power grid; or, a central tap of the autotransformer is connected to the other end of the AC input power grid, and the boost inductor is integrated in the autotransformer. The front end of each of the at least two groups of bidirectional switches is connected to an intermediate connection point of one of the front bridge arms, and the rear end of each of the at least two groups of bidirectional switches is connected to an intermediate connection point of the rear bridge arm. Each of the front bridge arms includes two diodes unidirectionally connected in series, the intermediate connection point is located between the two diodes, and two ends of each of the front bridge arms are connected to two ends of the bus filter capacitor, respectively. The rear bridge arm includes two diodes unidirectionally connected in series, the intermediate connection point is located between the two diodes, and two ends of the rear bridge arm are connected to two ends of the bus filter capacitor, respectively.

In the power factor correction converter provided in the embodiments of the present invention, a multistate switch unit circuit formed by a boost inductor, an autotransformer, and multiple groups of bidirectional switches has multiple working states. Each case includes two states, that is, each group of bidirectional switches being turned on or turn off simultaneously, and more working states that occur when some bidirectional switches are turned on and some bidirectional switches are turned off. In one switching period, the number of times that the boost inductor is charged and discharged is equal to the number of groups of bidirectional switches, then the ripples on the boost inductor and the bus filter capacitor are reduced. In this case, the effective value of the current passing through a transistor of a bidirectional switch becomes smaller, thereby improving the conversion efficiency. In addition, the frequency of the ripple on the boost inductor is several times as much as that of the switch, and this number of times is also equal to that of the groups of bidirectional switches, so that the inductance of the boost inductor is further decreased, which makes the size of the circuit smaller and power density higher, thereby solving the technical problems of the low conversion efficiency and power density in the prior art.

Embodiment 1

Figure 1:
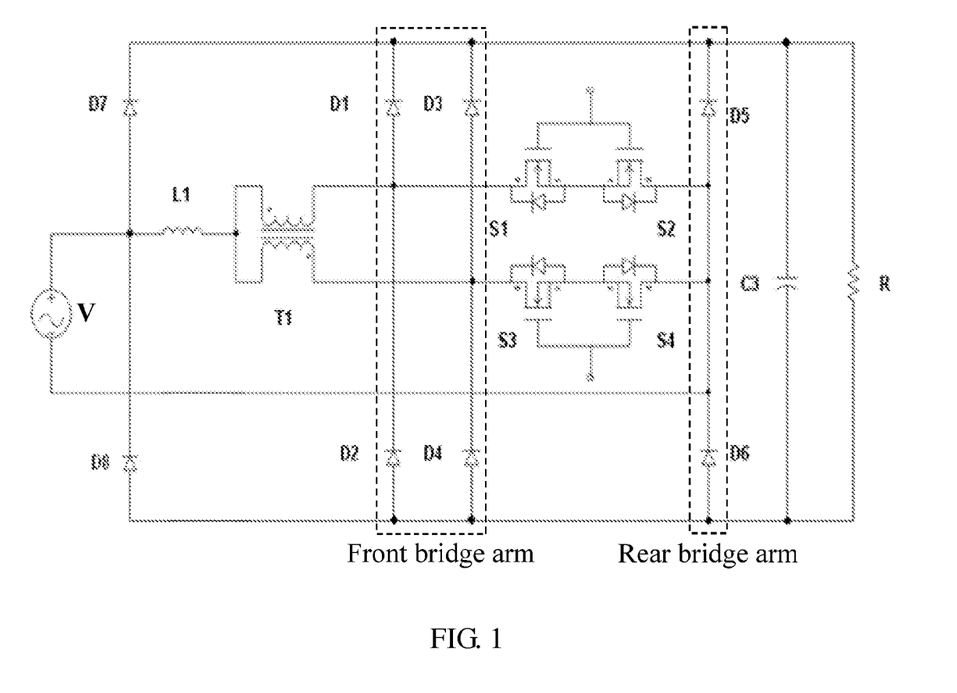

As shown in FIG. 1, a power factor correction converter provided in an embodiment of the present invention includes two groups of bidirectional switches, that is, S1-S2 and S3-S4. Since coils in an autotransformer T1, front bridge arms, and the groups of the bidirectional switch are in one-to-one correspondence, both the number of the coils in the autotransformer and the number of the front bridge arms both are 2 according to the embodiment of the present invention. Furthermore, to achieve better technical effect, the autotransformer T1 in which two coils have the same number of turns is selected.

As an exemplary solution, the power factor correction converter according to the embodiment of the present invention further includes a protective bridge arm, the protective bridge arm includes two protective diodes D7 and D8 unidirectionally connected in series, an intermediate connection point located between D7 and D8 is connected to an input end of a boost inductor L1, and two ends of the protective bridge arm are connected to two ends of a bus filter capacitor C3, respectively. The protective bridge arm formed by the protective diodes D7 and D8 is used for preventing a main topological circuit from being damaged by the surge energy of a lightning stroke.

Figure 2:
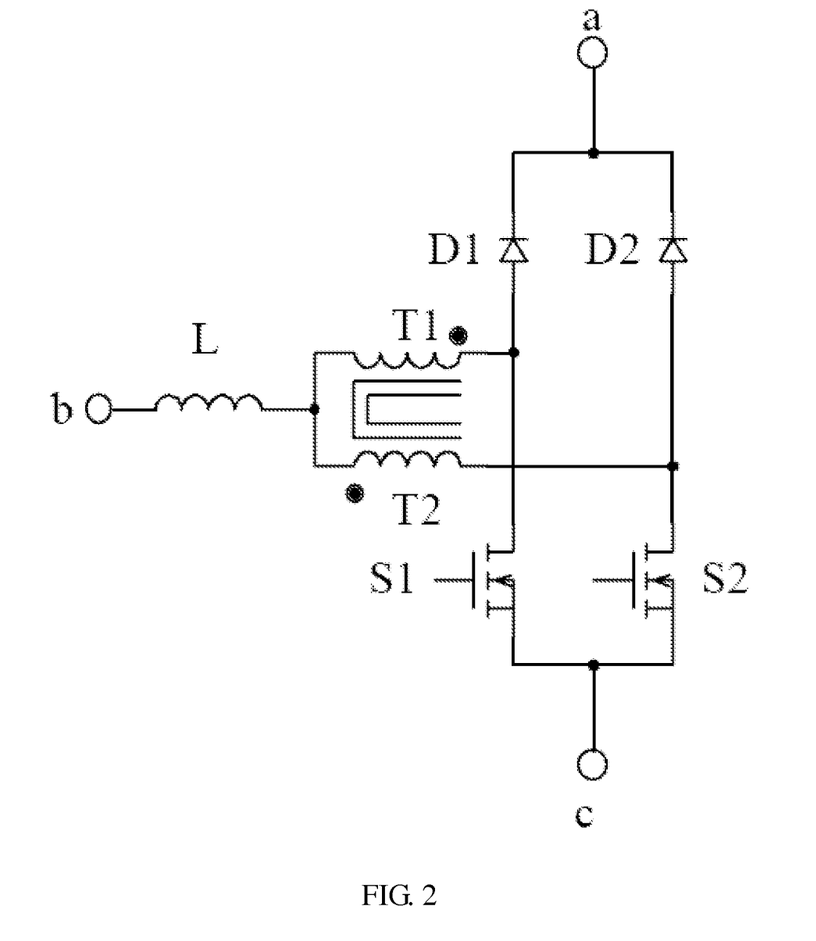
FIG. 2 is a schematic diagram of an application manner of a tristate switch unit circuit in the power factor correction converter according to Embodiment 1 of the present invention.

In the power factor correction converter provided in the embodiment of the present invention, a boost inductor L1, an autotransformer T1, and two groups of bidirectional switches S1-S2 and S3-S4 form a tristate switch unit circuit, which includes three states, that is, two groups of bidirectional switches being turned on simultaneously, two groups of bidirectional switches being turned off simultaneously, and one group being turned on and the other group being turned off, and the three states are implemented through common pulse width modulation (PWM) control. FIG. 2 is an application manner of the tristate switch unit circuit, where D1, D2, S1, and S2 correspond to D1, D3, S1, and S3 shown in FIG. 1, respectively, and T1 and T2 indicate two coils of the autotransformer T1 shown in FIG. 1. Working principles of the three states are described in the following.

Figure 3:
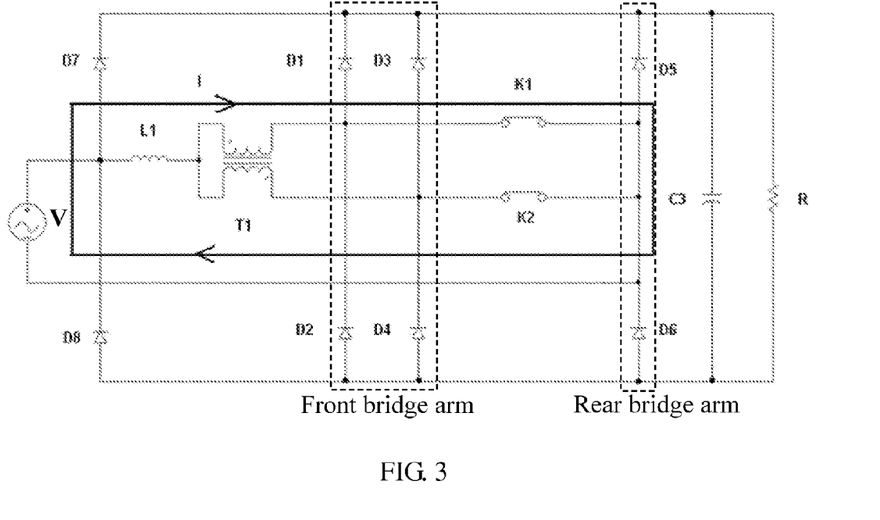
FIG. 3 is an equivalent schematic diagram of State 1 of the power factor correction converter when an AC input power grid is in a positive half period according to Embodiment 1 of the present invention.

As shown in FIG. 3, two groups of bidirectional switches S1-S2 and S3-S4 can be simplified as two switches K1 and K2. In a positive half period of the voltage of an AC input power grid V, State 1:

Pulse width modulation (PWM) carrier signals of the bidirectional switches K1 and K2 are sawtooth waves having a phase difference of 180 degrees, and a duty cycle command of the PWM is provided by a PFC control circuit; when the duty cycles of the bidirectional switches K1 and K2 are greater than 50%, the bidirectional switches K1 and K2 may be turned on simultaneously. At this time, two coils of the autotransformer T1 are short circuited by the bidirectional switches K1 and K2, respectively, the boost inductor L1 is charged by the AC input power grid V, and the voltage on a load R is provided by a bus filter capacitor C3.

Figure 4A:
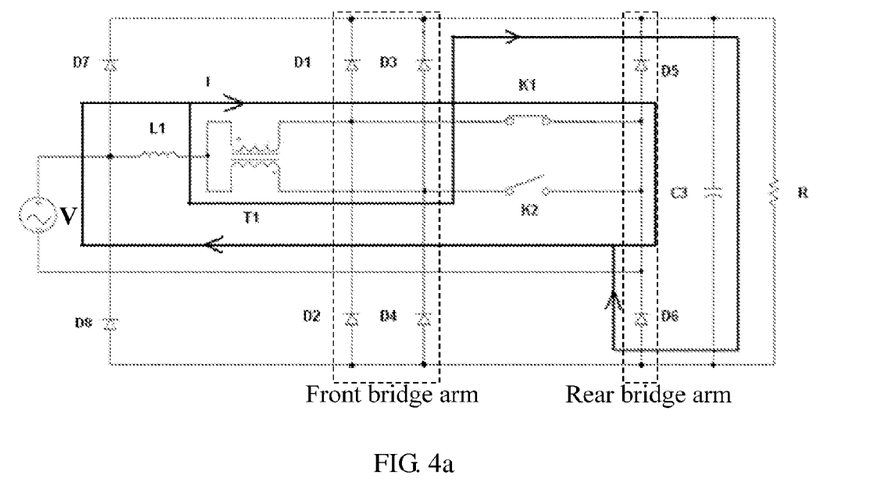
FIGS. 4*a* and 4*b* are equivalent schematic diagrams of State 2 of the power factor correction converter when the AC input power grid is in a positive half period according to Embodiment 1 of the present invention.

State 2:

As shown in FIG. 4a, when the bidirectional switch K1 is turned on and the bidirectional switch K2 is turned off, a coil which is in the autotransformer T1 and is connected to the bidirectional switch K1 is directly in electrical connection with the AC input power grid V and the current on the coil returns to the AC input power grid V. The AC input power grid V is connected in series to the boost inductor L1, to supply power to the load R through a coil in the autotransformer T1, the diode D3 on a front bridge arm, and the diode D6 on the rear bridge arm and charge the bus filter capacitor C3, where the coil is connected to the bidirectional switch K2. The boost inductor L1 may be in a charging status or in a discharging status, depending on the instantaneous voltage value of the AC input power grid V. At this time, the voltage of the bus of the load end is 400 V, two coils of the autotransformer T1 are electrically connected to positive and negative ends of the bus through the diodes D3 and D6, respectively. Since the current passing through each of the two coils is half of that of the boost inductor L1, the voltage on a central tap of the autotransformer T1, that is, the voltage between the output end of the boost inductor L1 and the negative end of the bus, is half of that of the bus, that is, 200 V.

Figure 4B:
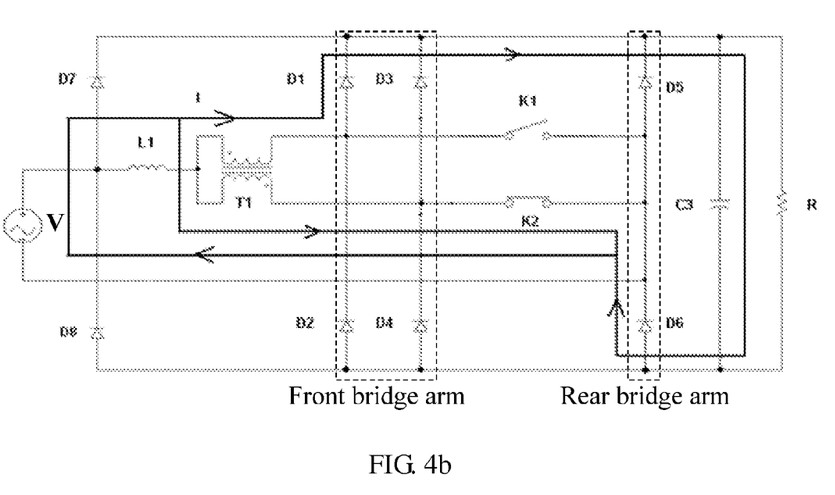

As shown in FIG. 4b, when the bidirectional switch K2 is turned on and the bidirectional switch K1 is turned off, a coil which is in the autotransformer T1 and is connected to the bidirectional switch K2 is directly in electrical connection with the AC input power grid V and the current on the coil returns to the AC input power grid V. The AC input power grid V is connected in series to the boost inductor L1, to supply power to the load R through a coil in the autotransformer T1, the diode D1 on the front bridge arm, and the diode D6 on the rear bridge arm and charge the bus filter capacitor C3, where the coil is connected to the bidirectional switch K1. The boost inductor L1 may be in a charging status or in a discharging status, depending on the instantaneous voltage value of the AC input power grid V. Similarly, at this time, the voltage on the central tap of the autotransformer T1, that is, the voltage between the output end of the boost inductor L1 and the negative end of the bus, is half of that of the bus, that is, 200 V.

Figure 5:
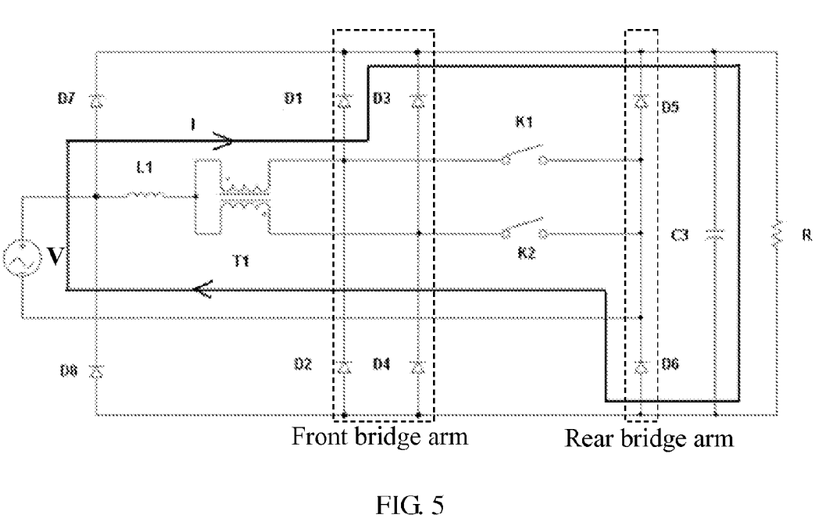
FIG. 5 is an equivalent schematic diagram of State 3 of the power factor correction converter when the AC input power grid is in a positive half period according to Embodiment 1 of the present invention.

State 3:

As shown in FIG. 5, when the duty cycles of the bidirectional switches K1 and K2 are smaller than 50%, the bidirectional switches K1 and K2 may be turned off simultaneously. At this time, the AC input power grid V is connected in series to the boost inductor L1, to supply a voltage to the load R through two coils of the autotransformer T1, the diodes D1 and D3 on the two front bridge arms, and the diode D6 on the rear bridge arm, and to charge the bus filter capacitor C3. The autotransformer is short circuited, and the boost inductor L1 is in a discharging status.

In a negative half period of the voltage of the AC input power grid V, the tristate switch unit circuit also has the foregoing three working states, and the working principles are the same as those in the positive half period; however, the direction of the current in the tristate switch unit circuit is reverse, and the current passes through different diodes on bridge arms.

Figure 6:
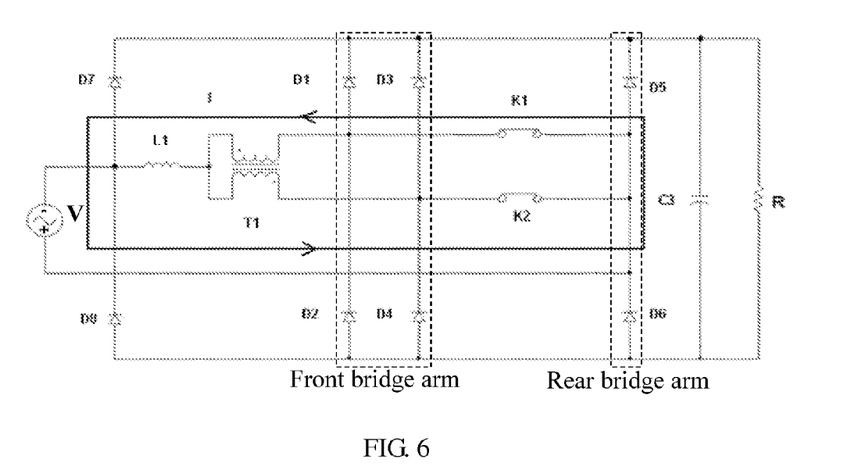
FIG. 6 is an equivalent schematic diagram of State 1 of the power factor correction converter when the AC input power grid is in a negative half period according to Embodiment 1 of the present invention.

As shown in FIG. 6, in the negative half period of the voltage of the AC input power grid V, State 1:

Two coils of the autotransformer T1 are short circuited by the bidirectional switches K1 and K2, respectively. The boost inductor L1 is charged by the AC input power grid V, and the voltage on the load R is provided by the bus filter capacitor C3.

Figure 7A:
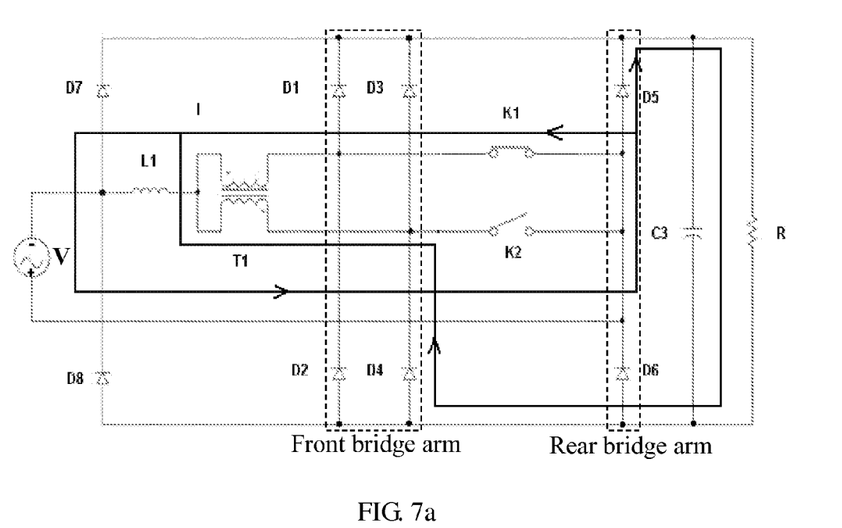
FIGS. 7*a* and 7*b* are equivalent schematic diagrams of State 2 of the power factor correction converter when the AC input power grid is in a negative half period according to Embodiment 1 of the present invention.

State 2:

As shown in FIG. 7a, when the bidirectional switch K1 is turned on and the bidirectional switch K2 is turned off, the coil which is in the autotransformer T1 and is connected to the bidirectional switch K1 is directly in electrical connection with the AC input power grid V, and the current on the coil returns to the AC input power grid V. The AC input power grid V is connected in series to the boost inductor L1, to supply power to the load R through a coil in the autotransformer T1, the diode D4 on the front bridge arm, and the diode D5 on the rear bridge arm and charge the bus filter capacitor C3, where the coil is connected to the bidirectional switch K2. The boost inductor L1 may be in a charging status or in a discharging status, depending on the instantaneous voltage value of the AC input power grid V. At this time, the voltage of the bus of the load end is 400 V, two coils of the autotransformer T1 are connected to positive and negative ends of the bus through the diodes D5 and D4 in electrical connection, respectively. Since the current passing through the two coils is half of that of the boost inductor L1, the voltage on a central tap of the autotransformer T1, that is, the voltage between the output end of the boost inductor L1 and the negative end of the bus, is half of that of the bus, that is, 200 V.

Figure 7B:
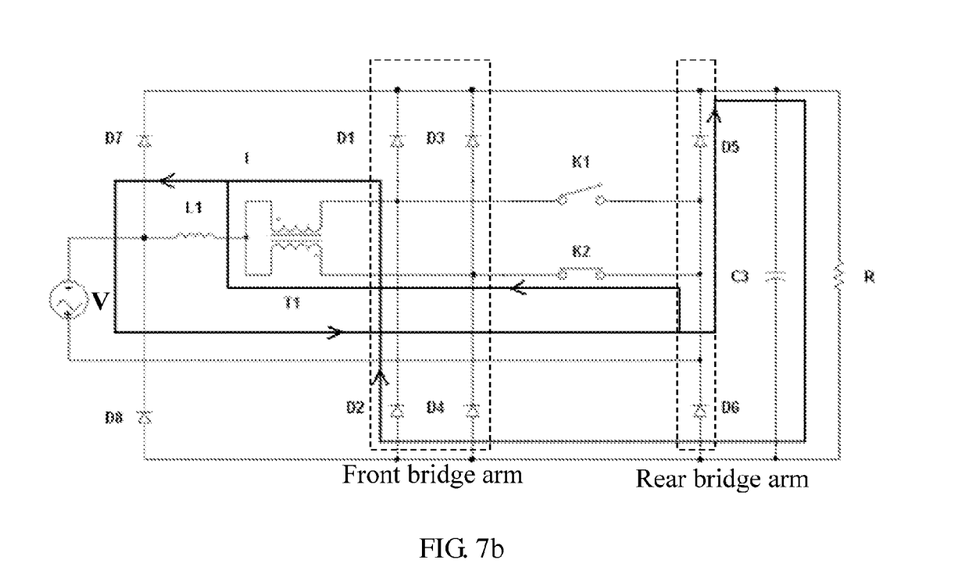

As shown in FIG. 7b, when the bidirectional switch K2 is turned on and the bidirectional switch K1 is turned off, the coil which is in the autotransformer T1 and is connected to the bidirectional switch K2 is directly in electrical connection with the AC input power grid V, and the current on the coil returns to the AC input power grid V. The AC input power grid V is connected in series to the boost inductor L1, to supply power to the load R through a coil in the autotransformer T1, the diode D2 on the front bridge arm, and the diode D5 on the rear bridge arm and charge the bus filter capacitor C3, where the coil is connected to the bidirectional switch K1. The boost inductor L1 may be in a charging status or in a discharging status, depending on the instantaneous voltage value of the AC input power grid V. Similarly, at this time, the voltage on the central tap of the autotransformer T1, that is, the voltage between the output end of the boost inductor L1 and the negative end of the bus, is half of that of the bus, that is, 200 V.

Figure 8:
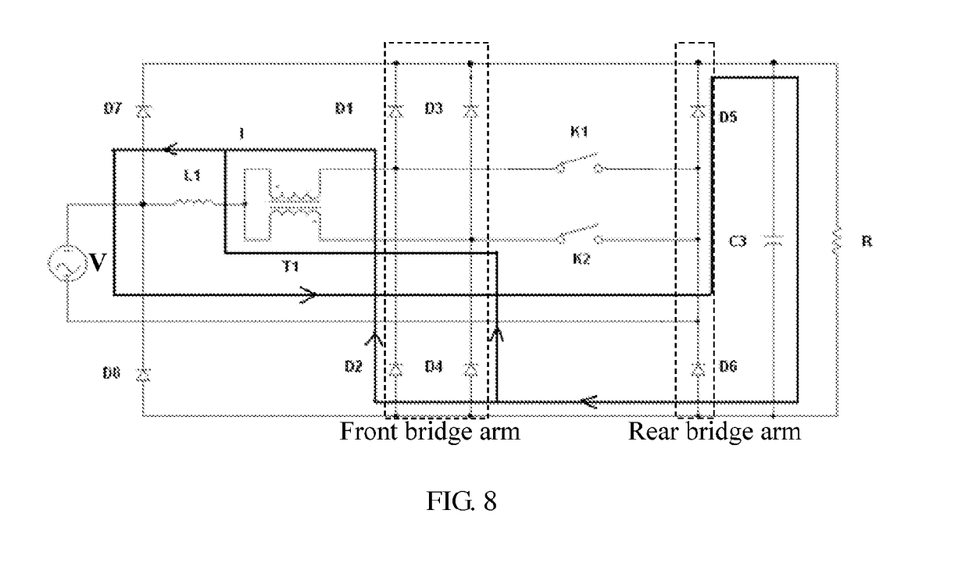
FIG. 8 is an equivalent schematic diagram of State 3 of the power factor correction converter when the AC input power grid is in a negative half period according to Embodiment 1 of the present invention.

State 3:

As shown in FIG. 8, at this time, the AC input power grid V is connected in series to the boost inductor L1, to supply a voltage to the load R through two coils in the autotransformer T1, the diodes D2 and D4 on the front bridge arms, and the diode D5 on the rear bridge arm, and to charge the bus filter capacitor C3. The autotransformer is short circuited, and the boost inductor L1 is in a discharging status.

A tristate switch unit circuit is used, the boost inductor L1 is charged twice and discharged twice in one PWM switching period, so the ripples on the boost inductor L1 and the bus filter capacitor C3 are reduced. In this case, the effective value of the current passing through transistors of bidirectional switches S1-S2 and S3-S4 are smaller, thereby improving the conversion efficiency. In addition, the frequency of the ripple on the boost inductor L1 is twice as that of a PWM switch, so that the inductance of the boost inductor L1 is decreased by 50%, which makes the size of the circuit smaller and the power density higher, thereby solving the technical problems of the low conversion efficiency and power density in the prior art.

In addition, since two coils of the autotransformer T1 are symmetric, the currents flowing from the two coils are more symmetric, thereby solving a problem that the currents cannot be evenly distributed due to the difference of component parameters in an interleaving solution. Since a tristate switch unit circuit is used, an output end of the boost inductor L1, relative to the AC input power grid V, provides five voltages: 0 V, ±200 V, and ±400 V, while a conventional interleaving technical solution only provides three voltages: 0 V and ±400 V. Therefore, the bidirectional switch of the power factor correction converter provided in an embodiment of the present invention has lower loss. In addition, since an input voltage is closer to a sine wave, indexes of a total harmonic distortion (THD) and power factor are better. If more groups of bidirectional switches are used, an output end of the boost inductor, relative to the voltage of the AC input power grid V, can provide more voltage values and an input voltage is closer to a sine wave, thereby obtaining better technical indexes. The more bidirectional switches are used, the closer that an input voltage is to the sine wave and the more noticeable the beneficial effects are.

In an embodiment of the present invention, two front bridge arms each are formed by two fast switching diodes unidirectionally connected in series. Since a voltage that a diode of a front bridge arm can bear changes from 0 V to 400 V at a PWM switch frequency (for example, 50 kHz), a fast switching diode with fast reverse recovery is needed. A voltage that a diode of a rear bridge arm can bear changes from 0 V to 400 V at a frequency twice as much as a power grid frequency (for example, 100 Hz), so a low-cost and low-speed rectification diode can be used to meet a requirement. Definitely, a MOS transistor or a fast diode can be used to replace a low-speed rectification diode, to further improve the efficiency.

Figure 9:
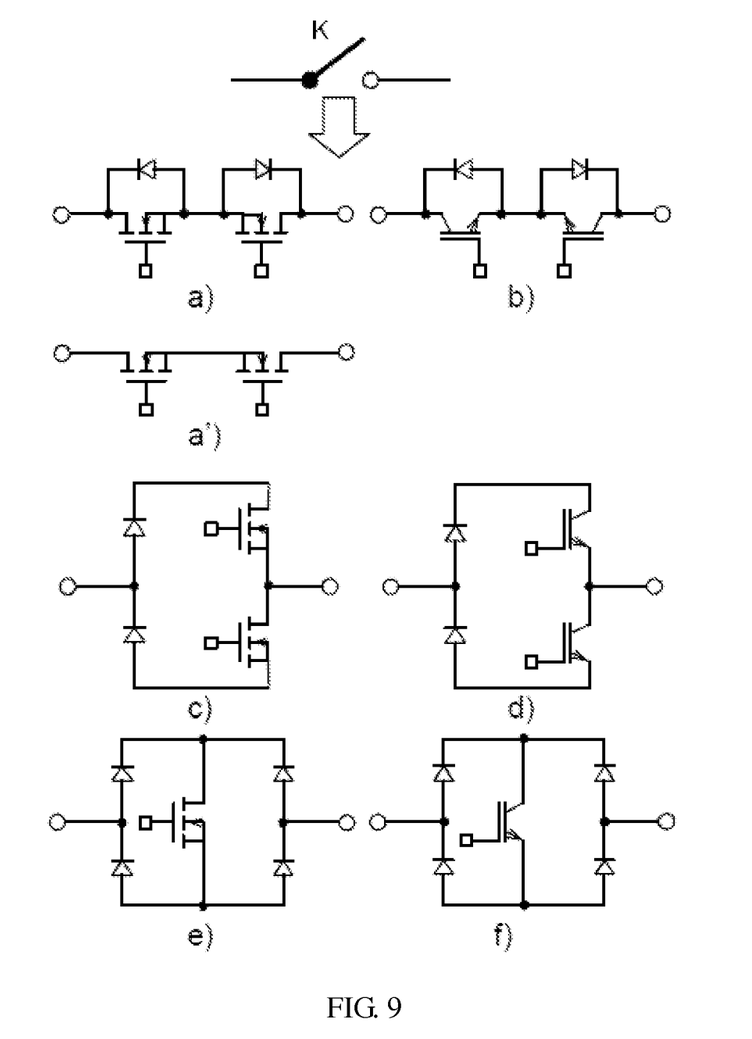
FIGS. 9*a* to 9*f* are schematic diagrams of implementation of a bidirectional switch of the power factor correction converter according to Embodiment 1 of the present invention.

A bidirectional switch is constituted by one or more diodes, one or more MOS transistors, one or more transistors, and a combination of one or more of the three. Definitely, a combination of other transistors can constitute a bidirectional switch. As shown in FIGS. 1 and 9a, in this embodiment, a combination of a diode and a MOS transistor are used to implement a bidirectional switch; or a transistor is used to replace a MOS transistor, as shown in FIG. 9b.

FIGS. 9c to 9f show implementation in which a diode, a MOS transistor, and a transistor form a bidirectional switch in other combinations.

Embodiment 2

Figure 10:
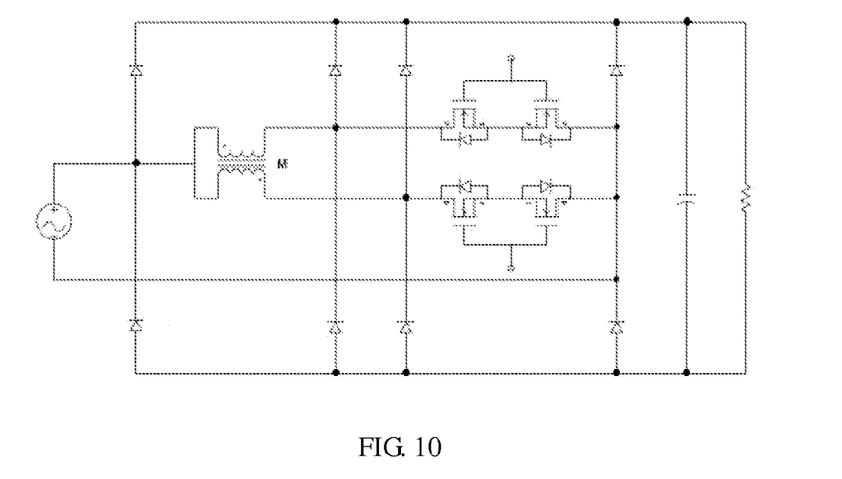
FIG. 10 is a schematic connection diagram of a power factor correction converter according to Embodiment 2 of the present invention.

This embodiment is similar to Embodiment 1. The difference is that, as shown in FIG. 10, in this embodiment, a boost inductor is integrated in an autotransformer. For an application requiring low power, a boost inductor can be integrated in the autotransformer, so that a required boost induction value is obtained by adjusting a coupling coefficient M of the autotransformer, to further decrease the size and cost of a converter.

Embodiment 3

Figure 11:
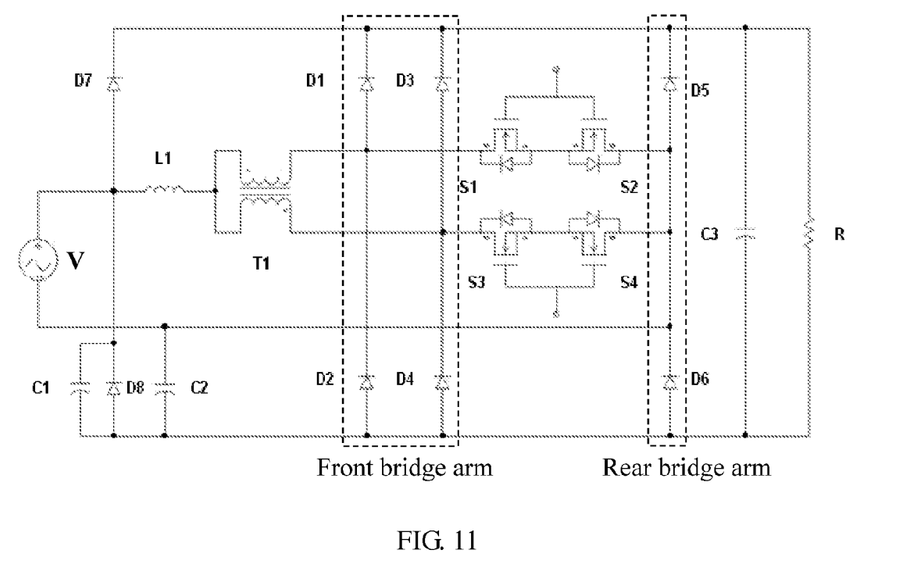
FIG. 11 is a schematic connection diagram of a power factor correction converter according to Embodiment 3 of the present invention.

This embodiment is similar to Embodiment 1. The difference is that, as shown in FIG. 11, in this embodiment, two clamped capacitors C1 and C2, which are configured to suppress common mode noise interference, are further included, where one end of the clamped capacitor C1 and one end of the clamped capacitor C2 are correspondingly connected to two ends of the AC input power grid, and the other end of the clamped capacitor C1 and the other end of the clamped capacitor C2 connected to each other are connected to one end of the bus filter capacitor C3. The two clamped capacitors C1 and C2 are capable of suppressing electromagnetic interference, especially common mode noise interference.

An embodiment of the present invention also provides a power factor correction conversion device. The power factor correction conversion device includes the foregoing power factor correction converter, an AC input power grid, and a load, where one end of the AC input power grid is connected to the rear end of each group of bidirectional switches, the other end of the AC input power grid is connected to an input end of the boost inductor, and two ends of the load are connected to two ends of the bus filter capacitor, respectively.

Embodiment 4

A power factor correction conversion device provided in an embodiment of the present invention has two groups of bidirectional switches. Since the coils in an autotransformer, the front bridge arms and the groups of bidirectional switches are in one-to-one correspondence, both the number of coils in the autotransformer and the number of front bridge arms both are 2 according to an embodiment of the present invention. Furthermore, to achieve better technical effect, an autotransformer in which two coils have the same number of turns is selected.

A tristate switch unit circuit is used, the boost inductor is charged twice and discharged twice in one switching period, so the ripples on the boost inductor and the bus filter capacitor are reduced. In this case, the effective value of the current passing through a transistor of a bidirectional switch is smaller, thereby improving the conversion efficiency. In addition, since the frequency of the ripple on a boost inductor is twice as much as that of a switch, the inductance of the boost inductor can be decreased by 50%, which makes the size of the circuit smaller and the power density higher, thereby solving the technical problems of the low conversion efficiency and power density in the prior art.

In addition, since two coils of the autotransformer are symmetric, the currents flowing from the two coils are more symmetric, thereby solving a problem that the currents cannot be evenly distributed due to the difference of component parameters in an interleaving solution. Since a tristate switch unit circuit is used, an output end of the boost inductor, relative to the AC input power grid, provides five voltages: 0 V, ±200 V, and ±400 V, while a conventional interleaving technical solution only provides three voltages: 0 V and ±400 V. Therefore, a bidirectional switch of the power factor correction converter provided in the embodiment of the present invention has lower loss. In addition, since an input voltage is closer to a sine wave, indexes of a total harmonic distortion (THD) and power factor are better. If more groups of bidirectional switches are used, an output end of the boost inductor, relative to the voltage of the AC input power grid, has more voltage values and an input voltage is closer to a sine wave, thereby obtaining better technical indexes. The more bidirectional switches are used, the closer the input voltage is to a sine wave and the more noticeable the positive effects are.

Since a conveying device provided in this embodiment of the present invention has the same technical features as those provided in the foregoing embodiments of the present invention, the same technical effects can be produced, and the same technical problems can be solved.

In the embodiment of the present invention, a pulse width modulation (PWM) controller is further included, and a bidirectional switch includes a MOS transistor or a transistor, where the PWM controller is connected to a gate of the MOS transistor or is connected to a base of the transistor. PWM carrier signals are sawtooth waves having a phase difference of 180 degrees, and a duty cycle command of the PWM controller is provided by a PFC control circuit, to achieve multiple working states of a bidirectional switch.

The foregoing descriptions are merely about specific embodiments of the present invention, but the protection scope of the present invention is not limited thereto. Changes or replacements readily thought of by persons skilled in the prior art within the technical scope disclosed by the present invention should fall within the protection scope of the present invention. Therefore, the protection scope of the present invention is subject to the appended claims.

What is claimed is:

1. A power factor correction converter, comprising:
at least two groups of bidirectional switches;
an autotransformer;
a boost inductor;
a bus filter capacitor;
at least two front bridge arms; and
a rear bridge arm,
wherein a front end of each group of the at least two groups of the bidirectional switches is connected to a coil of the autotransformer in one-to-one correspondence,
wherein a rear end of each group of the at least two groups of the bidirectional switches is connected to one end of an alternating current (AC) input power grid,
wherein a central tap of the autotransformer is connected to an output end of the boost inductor,
wherein an input end of the boost inductor is connected to the other end of the AC input power grid or, a central tap of the autotransformer is connected to the other end of the AC input power grid,
wherein the boost inductor is integrated in the autotransformer,
wherein the front end of each of the at least two groups of bidirectional switches is connected to an intermediate connection point of one of the front bridge arms,
wherein the rear end of each of the at least two groups of bidirectional switches is connected to an intermediate connection point of the rear bridge arm,
wherein each of the front bridge arms include two diodes unidirectionally connected in series,
wherein the intermediate connection point is located between the two diodes,
wherein two ends of each of the front bridge arms are connected to two ends of the bus filter capacitor, respectively,
wherein the rear bridge arm includes two diodes unidirectionally connected in series,
wherein the intermediate connection point is located between the two diodes, and
wherein two ends of the rear bridge arm are connected to two ends of the bus filter capacitor, respectively.

2. The power factor correction converter according to claim 1, wherein the at least two groups of bidirectional switches are only two groups.

3. The power factor correction converter according to claim 1, wherein the number of turns of each coil in the autotransformer is equal.

4. The power factor correction converter according to claim 1, wherein the at least two front bridge arms each are formed by two fast diodes unidirectionally connected in series.

5. The power factor correction converter according to claim 1, further comprising a protective bridge arm, wherein the protective bridge arm comprises:
two protective diodes unidirectionally connected in series;
an intermediate connection point located between two protective diodes that is connected to the input end of the boost inductor, and
wherein two ends of the protective bridge arm are connected to two ends of the bus filter capacitor, respectively.

6. The power factor correction converter according to claim 1, further comprising two clamped capacitors configured to suppress common mode noise interference, wherein two ends of the two clamped capacitors are connected to two ends of the AC input power grid, respectively, and wherein the other two ends of the two clamped capacitors connected with each other are connected to one end of the bus filter capacitor.

7. A power factor correction conversion device, comprising:
a power factor correction converter;
an alternating current (AC) input power grid; and
a load,
wherein the power factor correction converter comprises at least two groups of bidirectional switches, an autotransformer, a boost inductor, a bus filter capacitor, at least two front bridge arms, and a rear bridge arm,
wherein a front end of each group of the at least two groups of the bidirectional switches is connected to a coil of the autotransformer in one-to-one correspondence,
wherein a rear end of each group of the at least two groups of the bidirectional switches is connected to one end of the AC input power grid,
wherein a central tap of the autotransformer is connected to an output end of the boost inductor,
wherein an input end of the boost inductor is connected to the other end of the AC input power grid or, a central tap of the autotransformer is connected to the other end of the AC input power grid,
wherein the boost inductor is integrated in the autotransformer,
wherein the front end of each of the at least two groups of bidirectional switches is connected to an intermediate connection point of one of the front bridge arms, wherein the rear end of each of the at least two groups of bidirectional switches is connected to an intermediate connection point of the rear bridge arm, wherein each of the front bridge arms include two diodes unidirectionally connected in series, wherein the intermediate connection point is located between the two diodes, wherein two ends of each of the front bridge arms are connected to two ends of the bus filter capacitor, respectively, wherein the rear bridge arm includes two diodes unidirectionally connected in series, wherein the intermediate connection point is located between the two diodes, wherein two ends of the rear bridge arm are connected to two ends of the bus filter capacitor, respectively, wherein one end of the AC input power grid is connected to the rear end of each group of bidirectional switches, wherein the other end of the AC input power grid is connected to the input end of the boost inductor, and wherein two ends of the load are connected to two ends of the bus filter capacitor, respectively.

\* \* \* \* \*